Dec. 23, 1958     N. E. PEDERSEN     2,866,019
DRIFTLESS DIRECT CURRENT AMPLIFIER
Filed Dec. 14, 1956     2 Sheets-Sheet 1

INVENTOR.
NORMAN E. PEDERSEN.
BY
*Christy, Parmelee & Strickland*
ATTORNEYS.

Dec. 23, 1958   N. E. PEDERSEN   2,866,019
DRIFTLESS DIRECT CURRENT AMPLIFIER
Filed Dec. 14, 1956   2 Sheets-Sheet 2
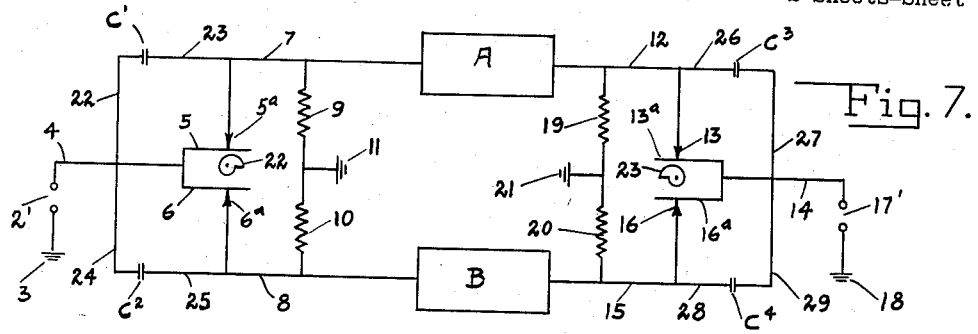
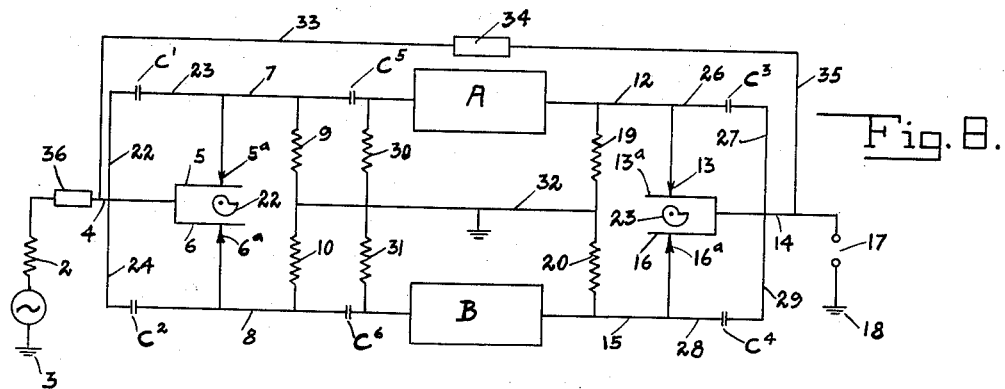
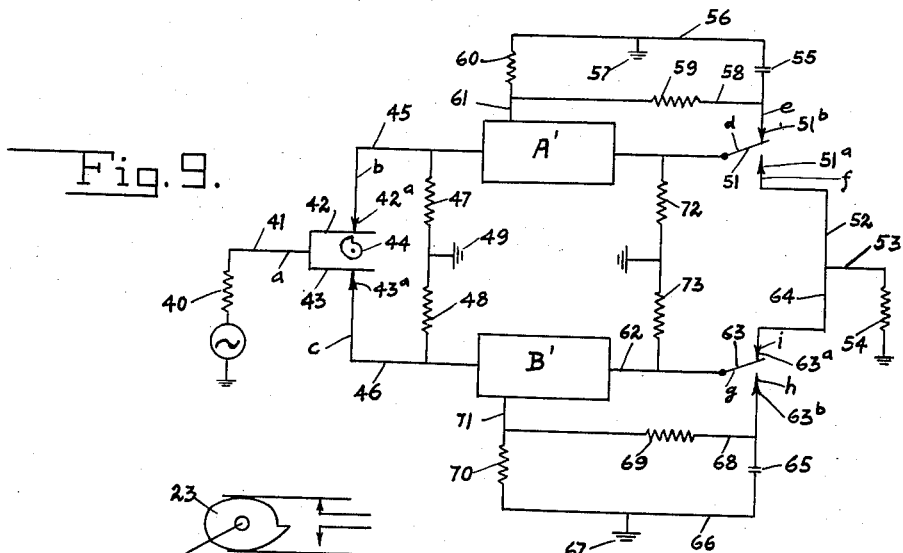
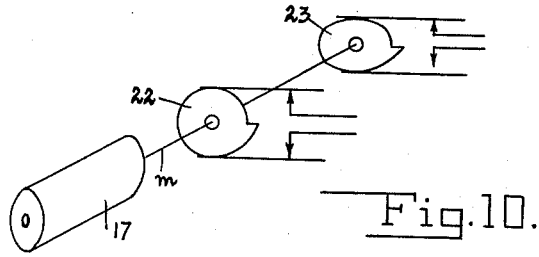
INVENTOR.
NORMAN E. PEDERSEN.
BY
ATTORNEYS.

United States Patent Office 2,866,019
Patented Dec. 23, 1958

2,866,019
DRIFTLESS DIRECT CURRENT AMPLIFIER
Norman E. Pedersen, Troy, N. Y.
Application December 14, 1956, Serial No. 628,248
13 Claims. (Cl. 179—171)

This invention relates to direct current amplifiers and relates more specifically to amplifiers requiring an accurately controlled output, as for example those used in analog computers, records and other apparatus in which the relation of the output voltage to the input signal must be maintained with close accuracy.

A simple conventional D. C. coupled amplifier is very sensitive to small drifts in power supply voltages, which limit the sensitivity to the order of a few millivolts or more. Therefore they generally require three or more power supplies which must be closely regulated in order to maintain the required sensitivity. It has the advantage that it suffers no serious frequency response limitations and frequency response can easily be made to usual requirements, as well as the additional advantage of being small and inexpensive, but these advantages are offset by the bulk and expense of the accessory equipment including the several separate power supply sources and controls therefor.

To simplify the power requirements and reduce D. C. drift, the "chopper" type D. C. amplifier has been devised. This involves an A. C. coupled amplifier circuit and by means of alternately connecting and disconnecting the D. C. input signal, a wave form is generated the amplitude of which is proportional to that of the input signal and this is amplified. Phase detection may be employed in the output to provide proper polarity reference with respect to the D. C. input polarity. The output is usually put through a smoothing network to convert the pulsating D. C. output to a smooth D. C. voltage. This apparatus is substantially free of D. C. drift and requires minimum power supply regulation. Frequency response however is limited to between ¼ to ⅒ of the chopping rate, and in general has a maximum value of the order of 10 C. P. S. Its frequency response is very non-linear and phase shifts are large.

From these two methods the "chopper-stabilized" amplifier developed which incorporates both the D. C. coupled and chopper type amplifiers in such a way that D. C. drift is reduced by a factor equal to the gain of the chopper amplifier and high frequency response is maintained by the D. C. coupled amplifier. This procedure not only requires a chopper but the usual number of regulated D. C. power supply sources.

A still further development has been the system recently introduced under the name "Dynograph" recorder amplifier which has the advantages of the chopper amplifier and which uses a chopper, but frequency response and phase shift characteristics have been improved. Frequency response is limited to below the chopping rate and phase shift imposes certain limitations.

My invention is applicable to either A. C. or D. C. coupled amplifiers and has for its principal objects to provide a D. C. amplifier which will enable the use of a single power source without need for close supervision and control, which will be free of drift and avoid the objections inherent in the arrangements above referred to or reduce them to insignificant levels.

My invention takes advantage of two simple principles, which may be stated before the detailed description of my invention and which may be explained as follows:

(1) If two identical voltage generators, that is, generators having the same voltage output and having substantially less internal impedance than their load are connected in parallel, the output voltage and current delivered to the load by the two in combination is identical to that which would be produced by either generator alone. Thus, if the generator impedance is small, one can switch generators in and out at will so long as at least one generator is at all times connected to the load. It will hereafter appear that my invention, using two amplifiers connected in parallel with the load and selectively connected with the input signal so that either one or both is always connected to the input and to the load, act in the same relation as two such generators.

(2) If there be a single voltage generator and two load resistances, each of which is large with respect to the generator resistance, the voltage appearing across either load resistance will be the same as that across them when they are in parallel. Thus, if the total load resistance is very large compared to the generator resistance, the load resistance can be halved if two similar resistances are connected in parallel and the voltage appearing across the two in combination will not differ from that which appears across either individual resistance when it alone is in circuit. The input impedance of the two amplifiers above referred to ar analogous to the above load resistances, and the input signal is analogous to the voltage generator.

My invention may be more fully understood by reference to the accompanying drawings in which:

Fig. 7 is a schematic diagram similar to Fig. 1 showing a modification especially useful for high frequencies;

Fig. 8 is a view similar to Fig. 7 showing still another modification wherein blocking condensers are employed between the input chopping switch and the parallel amplifiers for reducing grid current effects;

Fig. 9 is a schematic view of the circuit employed with D. C. coupled amplifiers; and Fig. 10 is a schematic view illustrating the synchronous operation of the input and output switches.

In connection with the drawings it may be noted that the invention makes use of common amplifier circuits such as are well known to those skilled in the art, and for purposes of clarity the drawings omit the individual amplifier circuit elements, showing the conventional portions of the circuits only in block outline.

Since my invention may be most easily understood in connection with A. C. coupled amplifiers, I shall first explain that embodiment of my invention.

Figure 1:
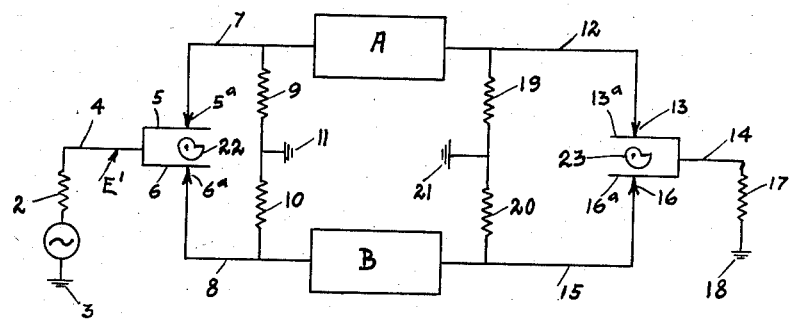
Fig. 1 is a schematic diagram of an amplifier embodying my invention utilizing A. C. coupled amplifier systems.
Figure 2:
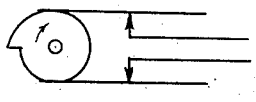
Figs. 2, 3, 4 and 5 are schematic views of a chopper switch, one of which is used between the input and the amplifier, and another of which is used at the output end of the amplifier, the views showing four successive positions of the switch.

Referring to Fig. 1, it shows two conventional A. C. coupled amplifiers, designated A and B, each having an identical voltage gain. The input signal source is schematically indicated at 2 with one side ground at 3 and the other side connected through wire 4 with two contacts 5 and 6. Contact 5 makes and breaks circuit with contact 5a that leads through wire 7 to the input of the amplifier A. The other contact makes and breaks circuit with a cooperating contact 6a that is connected through wire 8 to the input of amplifier B. Wires 7 and 8 are connected through matched resistors 9 and 10 to ground at 11.

The output of amplifier A passes through wire 12 to contact 13 and a cooperating contact 13a to a wire 14. The output of amplifier B is led through 15 to contact 16 and cooperating contact 16a to the wire 14. Wire 14 leads to the output current utilizing means or load indicated schematically at 17, which is connected to wire 14 and to ground at 18. The output wires 12 and 15 are connected through resistors 19 and 20, representing schematically the total D. C. output impedance of the two amplifiers A and B respectively. 19 and 20 are selected to be closely of the same value, although precise output impedance is not important.

Figure 5:
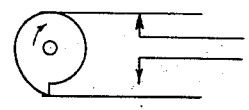
Figure 4:
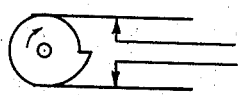
Figure 3:
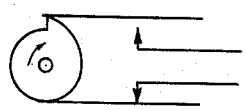

An actuator for the contacts 5—5a and 6—6a is schematically indicated at 22 and an actuator for contacts 13—13a, and 16—16a is indicated at 23. Referring to Figs. 2, 3, 4 and 5, it will be seen that the actuator 22 moves the contacts which it operates through a cycle involving four positions. Starting with Fig. 2, both switches 5—5a and 6—6a are closed so that both amplifiers are connected to the input signal source. In the second stage of the cycle, Fig. 3, switch contacts 5—5a are closed and 6—6a are open so that only amplifier circuit A is connected to the input. In the third position, Fig. 4, the switches are both closed as in Fig. 2, and in Fig. 5, showing the fourth position, contacts 6—6a are closed, connecting amplifier B to the input and 5—5a are open, disconnecting amplifier A from the input.

It is important that this operation be so adjusted that amplifiers A and B are alternately connected to the input but there is an intervening short time when both are connected to the input, so that the input always flows to one or the other or both amplifiers. The input circuit to at least one amplifier is therefore always closed.

The same arrangement exists for the contacts 13—13a and 16—16a in the output circuit, but the timing is such that 16—16a always opens slightly in advance of the opening of 6—6a so that the common output wire 14 is disconnected with amplifier B when both the input switches are closed and just before 6—6a break, and likewise the output leads the input in breaking the circuit to amplifier A, contacts 13—13a opening before 5—5a open. The output load 17 therefore is disconnected with one amplifier and then the other, but is always connected with at least one, but it will lead just enough so that the output or load 17 will never "see" the break at the input. Likewise switch 13—13a and 16—16a close after the switches 5—5a and 6—6a, respectively close, so that the noise generated by the closing of the switches at the input is never impressed on the output.

According to the first of the two principles stated in the early part of this specification, the output voltage and current will not change whether one or both of the amplifiers are connected to the output, and according to the second of these principles it makes no difference in the output if one or both amplifiers are connected with the input. The output signal therefore is of a character which would result if only one amplifier were used constantly or both used constantly.

Figure 6:
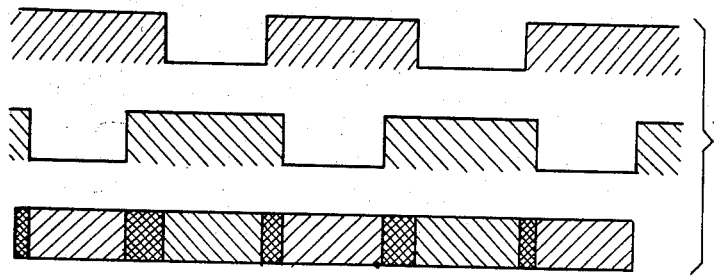
Fig. 6 is a composite diagram illustrating the overlapping in the switching functions at the input side of the system.

In Fig. 6 I have diagramed the time cycle during which amplifier A is accepting input signal and producing output signal; below this in proper relation is the diagram of the cycle in which B is accepting input and producing output; and below this is a composite diagram showing the overlap. At all times an input signal must produce an output signal. The input signal is connected to each amplifier more than fifty percent of the time, and each amplifier is connected to the output more than fifty percent of the time, but the time cycle during which the output is separately connected with each amplifier is shorter than the time cycle that the input of each amplifier is separately connected to the input signal.

It will thus be seen that the system, fulfilling the conditions of principles 1 and 2 above will pass to the output wire or terminal 14 as uninterrupted D. C. signal whose amplitude is proportional to the gain of the matched amplifiers A or B and that polarity reverses when input D. C. polarity reverses. All of the advantages of a chopped A. C. coupled amplifier are secured, but by having two amplifier circuits in parallel and timing the chopper as indicated, the limitations of the conventional chopped A. C. coupled amplifier are avoided.

The system as described will pass frequencies much in excess of the chopping rate, since the continuity of the connection between the input and output is not interrupted, but only the path is changed by the chopper. Frequency response will be limited only by interelectrode capacitance of the individual amplifiers and other normal inherent limiting factors.

By modifying the circuit shown in Fig. 1 to the extent shown in Fig. 7, high frequencies can be passed at all times by both amplifiers. In this figure, corresponding reference numerals to those of Fig. 1 are used to designate corresponding parts, but the signal input source is designated 2' and the output or load is designated 17'. In addition to all of the elements of Fig. 1, a condenser $C_1$ is shunted around the chopper switch to amplifier A, the circuit including wire 22 from the input wire 4 to the condenser $C_1$ and from this condenser wire 21 connects to wire 7. In a similar manner condenser $C_2$ is shunted around the chopper to amplifier B, there being wire 24 from the intput 4 to condenser $C_2$, the other side of which connects through wire 25 to wire 8. In like manner by-pass condensers $C_3$ and $C_4$ are shunted around the chopper switch in the output side of the system; $C_3$ being connected on one side through wire 26 to wire 12 with its other side connected through wire 27 to the common output wire 14. Likewise, condenser $C_4$ is connected at one side to wire 15 and at the other side to wire 14 through wires 28 and 29.

The condensers $C_1$, $C_2$, $C_3$ and $C_4$ will pass the high frequencies but block D. C. input and output voltages. The condensers are not necessary for amplification of frequencies much higher than the chopping rate but at frequencies of a few hundred kilocycles to a megacycle or so the phase shift will not be identical. In other words, at these frequencies the switching may appear in the output signal because of phase shift that may occur. Addition of the several condensers eliminates this effect since these frequencies will be passed by the condensers around the switch contacts and both amplifiers will, as to these frequencies, operate together, but the switching is of course operative to effect continuous amplification of D. C. and low frequency components of the input signal. Their respective capacities are small enough so that their charge times are much shorter than the duty cycle. Therefore the switching does not interrupt these signal frequencies but the switching corrects the deficiencies arising from the D. C. components of the system.

It is of course implied that the switching rate at the input, that is the on-off time, for both amplifiers be constant within closely controlled limits. If this is not so, the effect of a voltage gain change will appear in the output. The output switching, as long as it maintains the conditions above referred to, is not so critical. The switching arrangements shown in the diagram are of course schematic, serving as a simple illustration. Microswitches operated by a rotatable shaft, with the switches for both the input and output being operated by a single motor, appears to be satisfactory, and other devices presently available, such as the chopper now being made by Offner Electronics, Inc., of 5320 N. Kedzie Avenue, Chicago, Illinois, is adaptable for this purpose. In Fig. 10 I have schematically shown a single motor M driving a shaft m on which are two cams 22 and 23 with their corresponding switches. To illustrate my intention, cam 23 in Fig. 10 is diagramed as being slightly flatter than cam 22, so that contacts 5—5a and 6—6a will close ahead of contacts 13—13a and 16—16a respectively and open after they have opened, that is, the switching is synchronized to a fixed cycle, but does not occur concomitantly at the input and output. The output therefore never "sees" or reflects the switching at the input and amplified switch noise does not reach the output. Electronic switching presently available could be used but produces undesirable side effects that impair their utility for my purpose. A switching arrangement having the order of 100 C. P. S. is indicated to be most desirable and should be accurate to within about 10 microseconds for 0.1% accuracy for the system.

The amplifiers are selected to give good rectangular waveforms. The demands on the B+ supply to these amplifiers are meager and a completely unregulated supply with a time constant of the order of 0.5 second and fairly low impedances is adequate.

Since amplifiers of this character are especially useful in computer applications, Fig. 8 discloses the application of my invention to such purpose, using again A. C. coupled amplifiers. Here again corresponding reference numerals are used to identify the parts of the circuit with the corresponding parts of Figs. 1 and 2.

The three main problems associated with analog computer operational amplifiers are:
(1) D. C. drift;
(2) Grid current producing a D. C. voltage at the input of the operational amplifier; and
(3) Phase shift. Phase shift effects tend to become additive as more operations are performed.

With my system, D. C. drift is zero and with the circuit shown in Fig. 8, D. C. grid effects are zero, and phase shift is controlled as before indicated.

In Fig. 8 a blocking condenser $C_5$ is placed in wire 7 at the input side of amplifier A, and a similar condenser $C_6$ has been placed in the wire 8 at the input side of amplifier B. Resistances 30 and 31, which like resistances 9 and 10 are of several megohms, are connected into the input sides of the two amplifiers back of the respective condensers $C_5$ and $C_6$ and are connected to the common ground wire 32 which is also connected to the midpoint between resistors 9 and 10 and the midpoint between resistors 19 and 20.

In this modification, the condensers $C_5$ and $C_6$ block D. C. voltages associated with grid currents from reaching input circuit 4, which is critical. The direct D. C. input to the amplifiers is blocked by the condensers $C_5$ and $C_6$, but they have values so that they charge very rapidly compared to the duty cycle, so that in the time between the closing of the input switch and the closing of the corresponding switch to the output, each condenser is fully charged. Due to the chopping action a rectangular wave form is impressed on the amplifiers. The grid current attempting to flow in the reverse direction is constant and therefore blocked by the condensers $C_5$ and $C_6$. Also an overall feed-back is provided through the connection 32 in conjunction with the computing element circuit comprising wire 33, computer element 34 and wire 35, this circuit being across the input and output ends of the system. A computing element is also indicated in the input circuit at 36. Element 36 may generally be a resistance of the order of 1 megohm and 34 may be a resistance of the order of 1 megohm or a capacity of around 1 mfd. If both are resistances, there is a very heavy feed-back and amplifiers with open loop gains of 30,000,000 are made to have gains of around unity. If 34 is a capacitor, at 1 mfd. the circuit acts as an integrator, and with 34 as a resistance it acts as a summer. These circuits and these functions are fully discussed in the book "Electronic Analog Computers," by Korns and Korns, McGraw-Hill Book Company, 1952, and it is here sufficient to point out that 34 provides a very heavy feed-back loop.

It may be noted that a good transistor operational analog computer has not heretofore been provided, due largely to item 2 above, since with transistor amplifiers a healthy D. C. potential normally exists across the input terminals. The system shown in Fig. 8 eliminates this objection.

My invention may now be explained in connection with D. C. coupled amplifiers. The switching becomes more complex, but freedom from timing accuracy of the switching is secured. Reference may be had to Fig. 9 for a description of this system.

In this diagram 40 is the input signal source with a lead 41 that goes to a switching arrangement as heretofore described, having switch contacts 42—42a and 43 and 43a with an actuator 44. This switch is timed as previously described so that one pair of contacts closes in advance of the opening of the other pair and the input signal into the system is never broken by this switch.

Contacts 42—42a are connected through wire 45 with a D. C. coupled amplifier A', and contacts 43—43a are connected through wire 46 with D. C. coupled amplifier B', each of which are accurately matched to produce identical gain. Resistances of several megohms are indicated at 47 and 48 between wires 45 and 46 respectively and ground, indicated at 49.

The output of amplifier A' leads through wire 50 to a double throw switch 51 having contacts 51a and 51b. Contact 51a leads through wire 52 to the common output wire 53 and load 54. Contact 51b leads to a loop circuit comprising a condenser 55, a wire 56, grounded at 57, wire 58 with a resistance 59 therein and a resistance 60 at the end of the loop opposite the condenser with wire 61 connected into the loop between the two resistors and connected into the amplifier A' at or near the input side of the amplifier, this constituting a conventional reverse feed-back for the amplifier.

The output of amplifier B' is similarly arranged. Leading from the amplifier is a wire 62, leading to switch 63 having opposed contacts 63a and 63b. Contact 63a connects through wire 64 to the common output 53 and the load. Contact 63b connects to a loop or reverse feed-back circuit comprising condenser 65, wire 66 grounded at 67, wire 68 with the resistor 69 and with resistor 70 completing the loop, wire 71 leading to the amplifier at one of the early stages as with wire 61. Output impedances are indicated at 72 and 73.

The two amplifiers must give identical voltage gain with high enough input impedances and low enough output impedances for the two basic principles (1) and (2) hereinbefore explained to apply. The system functions as a self-stabilizing D. C. coupled system which operates continuously with respect to its input signal and its load. That is the switches 42, 43 at the input and 51, 63 in the output are related in the manner hereinbefore described so that the input and load are always in circuit through either one or the other or both amplifiers and contacts 51—51a open in advance of contacts 42—42a and close after these contacts close, while the same relation applies as to switch contacts 43—43a and 63—63a. The additional switching is provided by the contacts 51b and 63b and their associated circuits.

In operation, suppose a situation where 42—42a is closed and 51—51a are closed, condenser 55 has a short charge time compared to the duty cycle due to the low output impedance of amplifier A'. When contacts 51—51b open, the condenser has a long discharge time because of the impedance imposed by 59—60. There is a similar condition for the side of the system which includes amplifier B'. Thus, with proper timing of the switches, condenser 55 "samples" the drift of amplifier A', while B' has the whole job of amplifying the signal. Next switch 42—42a closes, followed by the closing of switch 51—51a. Then there is a short period of simultaneous amplification by both amplifiers and then the reverse condition when condenser 65 has a short charge time and B' can sample its own drift. Amplifier A' thus is not only functioning as a high gain amplifier, but is stabilizing its own drift. The same conditions apply to amplifier B'.

The drift in each case is that which it previously sampled, but if the power supply has a respectable time constant, the situation will remain unchanged over a period as short as that of the duty cycle. Thus, once each switching cycle, each amplifier has a chance to sample its own drift and correct the same through the heavy feed-back provided by their respective loops.

If (as also shown on the drawing) the letter $a$ be used to designate the input, $b$ the circuit to amplifier A', $c$ the circuit to amplifier B', and if $d$ designates switch 51, $e$ contact 51$b$, $f$ contact 51$a$ and $g$ to designate switch 63, $h$ 63$b$ and $i$ is 63$a$, the following is the switching sequence for one cycle. (In this schedule the dash represents a closed circuit and a comma a break between contacts, as $a$—$b$—$c$ means both switches 42—42$a$ closed and 43—43$a$ closed, while $a$—$c$, $b$ would mean 43—43$a$ closed and 42—42$a$ open):

| Time | Condition |
| --- | --- |
| $t_0$ | $a$—$b$—$c$; $d$—$f,e$; $g$—$i,h$ |
| $t_1$ | $a$—$b$—$c$; $d,f,e$; $g$—$i,h$ |
| $t_2$ | $a$—$c,b$; $d,f,e$; $g$—$i,h$ |
| $t_3$ | $a$—$c,b$; $d$—$e,f$; $g$—$i,h$ |
| $t_4$ | $a$—$c,b$; $d,e,f$; $g$—$i,h$ |
| $t_5$[1] | $a$—$c$—$b$; $d$—$f,e$; $g$—$i,h$ |
| $t_6$ | $a$—$c$—$b$; $d$—$f,e$; $g,i,h$ |
| $t_7$ | $a$—$b,c$; $d$—$f,e$; $g,i,h$ |
| $t_8$ | $a$—$b,c$; $d$—$f,e$; $g$—$h,i$ |
| $t_9$ | $a$—$b,c$; $d$—$f,e$; $g,h,i$ |
| $t_{10}$ | $a$—$b$—$c$; $d$—$f,e$; $g,h,i$ |
| $t_{11}$[1] | $a$—$b$—$c$; $d$—$f,e$; $g$—$i,h$ |

[1] (Same condition as at $t_0$).

While this table appears somewhat formidable, it shows the simple pattern of operation, and that having arranged the switching to follow this sequence, the system functions to substantially eliminate drift in a D. C. coupled amplifier system and avoid separate regulated power sources and respond smoothly to frequencies of the order of several hundred kilocycles to a megacycle or better. While the use of D. C. coupled amplifiers complicates the switching arrangement, the use of such circuits has compensating advantages which for some purposes is preferable, a principal one of which is that the time integral of output voltage over the duty cycle need not be zero, as with A. C. coupled amplifiers.

The switching arrangement previously described may be used, requiring only an additional open position contact for the output switches.

The basic apparatus employed is known in the art, but in my system I have provided a unique organization that avoids the limitations inherent in previous circuits. A discussion of much of the theory is not required for purposes of understanding the actual construction. In test equipment tube filament voltage was reduced from 6.3 volts to 5.0 volts but the indicated drift was less than one millivolt. Plate voltage using two small 300 volt B batteries was used for positive and negative supply sources. Over half hour periods the drift was less than 100 microvolts. One supply changed from 300 volts to 270 with an indicated drift of less than three millivolts.

The input and output impedances are of importance with D. C. and low frequency input signals. D. C. impedance of the order of several megohms, as for example 10 to 50 megohms, may be obtained easily. Output impedance of the order of a few ohms and less can be obtained by the use of simple negative feed-back and the healthy cathode follower. Feed-back in most applications of my amplifier is required to produce identical gains for the amplifiers A and B and A' and B', and can be made to do double duty in the securing of an ideal relation between input and output impedances.

It will be understood that the apparatus as schematically diagramed may be modified within the principles of my invention, and for which I claim:

1. An amplifying system comprising matched gain amplifiers in parallel relation to a common signal input and a common signal output, switching means between the common signal input and the two amplifiers for alternately connecting the amplifiers to the signal with intervening intervals during switching when both are connected to the input, switching means between each amplifier and the output for alternately connecting the output of each amplifier to the common output with intervening intervals during switching when both amplifiers are connected to the common output.

2. An amplifying system as defined in claim 1 in which the switching means at the input leads the switching means at the output in closing the input circuit to each amplifier alternately and follows the switching means at the output in opening the input circuit to each amplifier.

3. An amplifying system as defined in claim 2 wherein the switches have a common operating mechanism.

4. An amplifying system as defined in claim 2 in which resistors are connected to the input and output of each amplifier and to the ground, the resistors at the inputs of the two amplifiers being matched and those in the output of the two amplifiers being matched.

5. An amplifying system as defined in claim 2 wherein the switching means at the input and output are shunted with by-pass condensers whereby the switching means interrupts only the direct current flow and both amplifiers are at all times capacitatively coupled to the input and output, the by-pass condensers being of small capacity with a charge time much shorter than the interval during which the duty cycle in which the input of the amplifier is connected with the output.

6. An amplifying system as defined in claim 5 in which resistors are connected to the input and output of each amplifier and to the ground, the resistors at the inputs of the two amplifiers being matched and those in the output of the two amplifiers being matched.

7. An amplifying system as defined in claim 5 wherein there is also a blocking condenser in series between the switching means at the input and each amplifier to block the flow of grid current from the amplifiers to the input and there are resistors connected to ground at each side of each blocking condenser and also a resistor connected to the output side of each amplifier and the ground.

8. An amplifying system as defined in claim 7 in which the amplifiers are A. C. coupled amplifiers.

9. An amplifying system as defined in claim 2 in which the amplifiers are D. C. coupled and wherein each amplifier has a reverse feed-back loop connected into it, the switching means at the output including a contact which connects the output end of each amplifier to its reverse feed-back loop upon opening of the circuit to the common output.

10. An amplifying system as defined in claim 9 in which the feed-back loop comprises a condenser with a resistor between each side of the condenser and the point where the loop connects into its amplifier and the said contact connects directly to one side of the condenser so that the condenser has a short charge time and discharges at a slower rate through the resistors.

11. A D. C. amplifying system comprising two parallel amplifiers each having an input and output, switching means for connecting the amplifiers alternately to an input circuit with each connected to the input circuit more than 50% of the time, a single load to which the output of both amplifiers are connected, and switching means in the output of each amplifier for alternately connecting it with the load more than 50% of the time.

12. An amplifier system as defined in claim 11 wherein the switching means in the output operates synchronously with the input but leads the one at the input in opening and follows it in closing sufficiently that the switching at the input is not reflected in the output signal.

13. An amplifier system as defined in claim 12 wherein the amplifiers are D. C. coupled and wherein each amplifier has a reverse feed-back loop connected thereto, and contacts in the output switching means for closing a circuit from the output of the respective amplifiers to their respective reverse feed-back loops upon opening the circuit from the output of the respective amplifiers to the load.

References Cited in the file of this patent
UNITED STATES PATENTS

| | | |
|---|---|---|
| 2,129,860 | Mitchell | Sept. 13, 1938 |
| 2,775,657 | Van Zelst | Dec. 25, 1956 |